US008688248B2

(12) United States Patent
Wang

(10) Patent No.: US 8,688,248 B2
(45) Date of Patent: Apr. 1, 2014

(54) METHOD AND SYSTEM FOR CONTENT SAMPLING AND IDENTIFICATION

(75) Inventor: Avery Li-Chun Wang, Palo Alto, CA (US)

(73) Assignee: Shazam Investments Limited, London (GB)

( * ) Notice: Subject to any disclaimer, the term of this patent is extended or adjusted under 35 U.S.C. 154(b) by 2007 days.

(21) Appl. No.: 11/547,996

(22) PCT Filed: Apr. 19, 2005

(86) PCT No.: PCT/US2005/013014
§ 371 (c)(1),
(2), (4) Date: Oct. 31, 2006

(87) PCT Pub. No.: WO2005/101998
PCT Pub. Date: Nov. 3, 2005

(65) Prior Publication Data
US 2008/0154401 A1  Jun. 26, 2008

Related U.S. Application Data

(60) Provisional application No. 60/563,372, filed on Apr. 19, 2004.

(51) Int. Cl.
| | | |
|---|---|---|
| G06F 17/00 | (2006.01) |
| G06F 13/00 | (2006.01) |
| G10L 21/00 | (2013.01) |
| G10L 25/00 | (2013.01) |
| G10L 19/04 | (2013.01) |
| G11B 27/11 | (2006.01) |
| H04H 60/58 | (2008.01) |
| H04H 20/14 | (2008.01) |
| G10L 15/22 | (2006.01) |
| G10L 17/26 | (2013.01) |
| G10L 15/26 | (2006.01) |

(52) U.S. Cl.
CPC ............... *G11B 27/11* (2013.01); *H04H 60/58* (2013.01); *H04H 20/14* (2013.01); *G10L 15/22* (2013.01); *G10L 17/26* (2013.01); *G10L 15/265* (2013.01); *G10L 19/04* (2013.01)

USPC ........................... 700/94; 704/270; 704/500

(58) Field of Classification Search
CPC ....... G11B 27/11; H04H 60/58; H04H 20/14; G10L 15/22; G10L 17/26; G10L 15/265; G10L 19/04
USPC ............ 700/94, 231, 243, 273, 500; 704/270, 704/273; 725/18, 19, 22, 25; 702/71; 705/1, 705/26
See application file for complete search history.

(56) References Cited

U.S. PATENT DOCUMENTS

| 4,450,531 A | 5/1984 | Kenyon et al. |
| 4,843,562 A | 6/1989 | Kenyon et al. |

(Continued)

FOREIGN PATENT DOCUMENTS

WO    2005079499 A    9/2005

OTHER PUBLICATIONS

Erling Wold, Thom Blum, Douglas Keislar, and James Wheaton; "Content-Based Classification, Search, and Retrieval of Audio"; IEEE; 1996; pp. 27-35.*

(Continued)

*Primary Examiner* — Ella Colbert
(74) *Attorney, Agent, or Firm* — McDonnell Boehnen Hulbert & Berghoff LLP

(57) ABSTRACT

A method and system for content sampling (106) and identification is presented. A data stream is recorded, and samples of the stream are identified. Samples (106) can be initially taken at random for identification. Once a sample (106) is identified and segmented within the data stream, the next time to sample (106) may be calculated to be outside the time frame of the identified sample (106). Thus, the sampling period can be adaptively adjusted to be at times after identified tracks.

19 Claims, 6 Drawing Sheets

(56) References Cited

U.S. PATENT DOCUMENTS

| | | | |
|---|---|---|---|
| 5,210,820 A | | 5/1993 | Kenyon |
| 5,436,653 A | * | 7/1995 | Ellis et al. .................. 725/22 |
| 5,918,223 A | * | 6/1999 | Blum et al. ..................... 1/1 |
| 6,408,128 B1 | * | 6/2002 | Abecassis .................. 386/68 |
| 6,453,252 B1 | * | 9/2002 | Laroche .................... 702/75 |
| 6,574,594 B2 | * | 6/2003 | Pitman et al. ............. 704/236 |
| 6,611,678 B1 | * | 8/2003 | Zweig et al. ............ 455/161.3 |
| 6,925,489 B1 | * | 8/2005 | Curtin ...................... 709/217 |
| 7,174,293 B2 | | 2/2007 | Kenyon et al. |
| 7,194,752 B1 | | 3/2007 | Kenyon et al. |
| 7,328,153 B2 | * | 2/2008 | Wells et al. .............. 704/231 |
| 7,624,337 B2 | * | 11/2009 | Sull et al. ................. 715/201 |
| 8,572,646 B2 | * | 10/2013 | Haberman et al. .......... 725/34 |
| 2002/0082731 A1 | | 6/2002 | Pitman et al. |
| 2003/0014135 A1 | * | 1/2003 | Moulios ..................... 700/94 |
| 2003/0212997 A1 | * | 11/2003 | Hejna, Jr. .................. 725/88 |

OTHER PUBLICATIONS

Dictionary.com; Definition of "extrapolate", "extrapolated", and "extrapolating"; http://dictionary.reference.com/browse/extrapolate; downloaded Jan. 10, 2011; pp. 1-3.*

PRwire: "DVS Founder and CEO Discuss Solid Base"; Wednesday, Mar. 19, 2003; pp. 1-2.*

Malena Mesarina and Yoshio Turner; "Reduced energy decoding of MPEG streams"; Springer-Verilag 2003; pp. 202-213.*

International Search Report & Written Opinion issued for PCT/US05/13014 dated Feb. 26, 2007.

Supplementary Search Report for PCT/US2005/013014, dated Sep. 25, 2009.

European Search Report prepared by the European Patent Office in European patent application No. 12 15 3688, completed on May 4, 2012.

* cited by examiner

METHOD AND SYSTEM FOR CONTENT SAMPLING AND IDENTIFICATION

CROSS-REFERENCE TO RELATED APPLICATIONS

The present patent application claims priority under 35 U.S.C. §119(e) to U.S. Provisional Patent Application Ser. No. 60/563,372, filed on Apr. 19, 2004, the entirety of which is herein incorporated by reference.

FIELD OF INVENTION

The present invention generally relates to identifying content within broadcasts, and more particularly, to identifying segments of content within a data stream so as to calculate when to next sample data from the data stream.

BACKGROUND

As industries move toward multimedia rich working environments, usage of all forms of audio and visual content representations (radio broadcast transmissions, streaming video, audio canvas, visual summarization, etc.) becomes more frequent. Whether a user, content provider, or both, everybody searches for ways to optimally utilize such content. For example, one method that has much potential for creative uses is content identification. Enabling a user to identify content that the user is listening to or watching offers a content provider new possibilities for success.

In the field of broadcast monitoring and subsequent content identification, it is often desirable to identify as much audio content as possible while minimizing effort expended. In an example system, audio samples from a broadcast stream (such as a radio or television broadcast) are recorded and each audio sample is sent to an identification means, which returns an identity of the content of the audio sample. The recordation time of each audio sample can also be noted and a broadcast playlist can then be constructed that may list the audio tracks that were broadcast on each broadcast channel being monitored.

Existing monitoring systems may sample a broadcast stream periodically instead of continually and thus potentially under-sample the broadcast stream. In such an instance, content of a short duration may not be sampled at all and may be missed entirely. Alternatively, a monitoring system may over-sample a broadcast stream, which results in performing redundant samplings and content identifications, wasting computational effort. As a result, a method of optimizing sampling periods is desirable.

SUMMARY

Within embodiments disclosed herein, a method for segmenting an audio stream is presented. The method includes receiving a sample of an audio stream and a start time of the sample, and then determining a track identity of the sample and a relative time offset of the sample from a beginning of the identified track. The method further includes calculating an extrapolated start time of the identified track within the audio stream using the relative time offset and the start time of the sample. The extrapolated start time indicates a boundary between tracks in the audio stream.

In another aspect, the method includes receiving samples of an audio stream and start times of each sample, and for each sample, determining a track identity and an extrapolated start time of the identified track within the audio stream. The method further includes identifying samples having substantially similar extrapolated start times, and for samples having substantially similar extrapolated start times, verifying that the samples also have matching track identities.

In still another aspect, the method includes receiving an audio stream and selecting a portion of audio from the audio stream that comprises a sample from the audio stream. The method also includes determining a track identity of the sample and calculating an extrapolated start time and an extrapolated end time of the identified track within the audio stream. The method further includes marking a segment of the audio stream between the extrapolated start time and the extrapolated end time as a recognized audio segment, and calculating the next time to sample the audio stream based on a length of the recognized audio segment.

These as well as other features, advantages and alternatives will become apparent to those of ordinary skill in the art by reading the following detailed description, with appropriate reference to the accompanying drawings.

DETAILED DESCRIPTION

Within embodiments disclosed below, an adaptive sampling method is used to segment a broadcast stream (e.g., a radio or television broadcast) into recognized and non-recognized audio segments, abbreviated as "RA" and "NRA" respectively. The method is adaptive in that after recognizing or identifying audio, the system may then calculate when to next sample the broadcast stream based on lengths of the RA within the NRA, for example.

Figure 1:
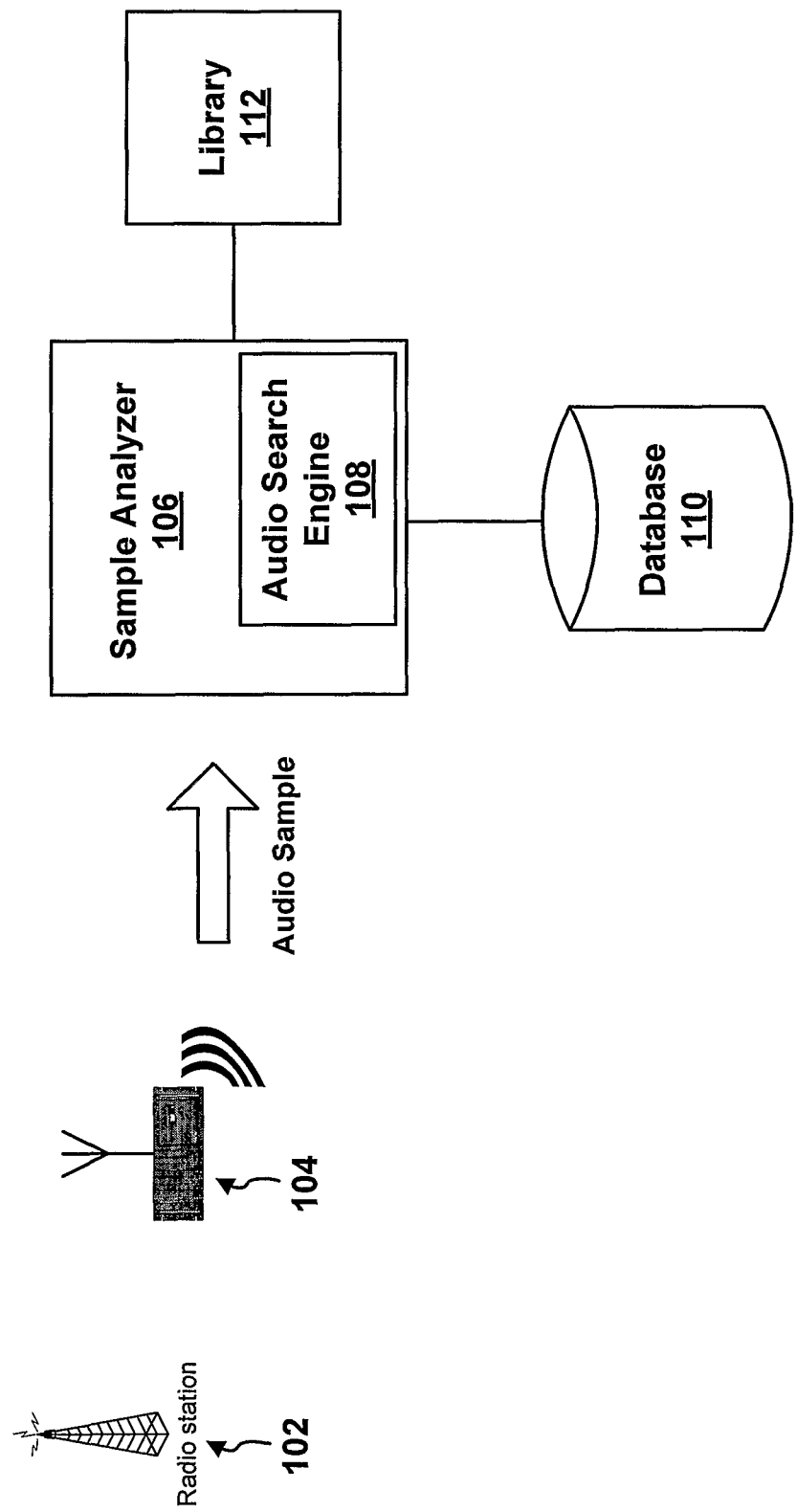
FIG. 1 illustrates one example of a system for identifying content within an audio stream.

Referring now to the figures, FIG. 1 illustrates one example of a system for identifying content from a broadcast source. The system includes radio stations, such as radio station 102, which may be a radio or television content provider, for example, that broadcasts audio streams and other information to a receiver 104. A sample analyzer 106 will monitor the audio streams received and identify information pertaining to the streams, such as track identities. The sample analyzer 106 includes an audio search engine 108 and may access a database 110 containing audio sample and broadcast information, for example, to identify tracks within the audio stream. Once tracks within the audio stream have been identified, the track identities may be reported to a library 112, which may be a consumer tracking agency, or other statistical center, for example.

The database 110 may include many recordings and each recording has a unique identifier, e.g., sound_ID. The database itself does not necessarily need to store the audio files for each recording, since the sound_IDs can be used to retrieve the audio files from elsewhere. The sound database index is expected to be very large, containing indices for millions or even billions of files, for example. New recordings are preferably added incrementally to the database index.

While FIG. 1 illustrates a system that has a given configuration, the components within the system may be arranged in other manners. For example, the audio search engine 108 may be separate from the sample analyzer 106. Thus, it should be understood that the configurations described herein are merely exemplary in nature, and many alternative configurations might also be used.

Figure 2:
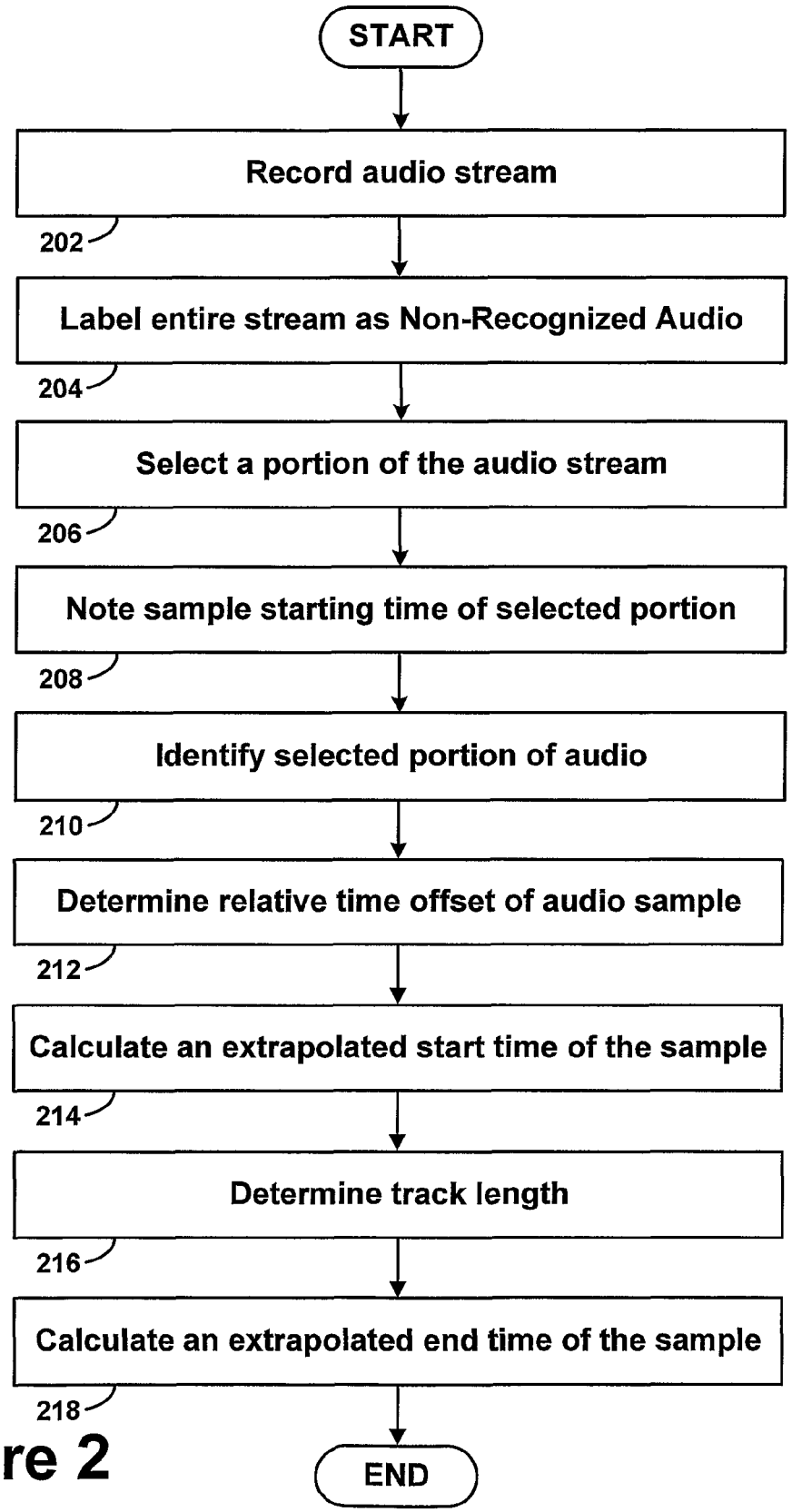
FIG. 2 is a flowchart depicting one example of a method for identifying content within a broadcast audio stream.

The system in FIG. 1, and in particular the sample analyzer 106, may identify content within an audio stream. FIG. 2 is a flowchart depicting one example of a method for identifying content within a broadcast audio stream. Initially, a broadcast stream is recorded, as shown at block 202, and is labeled in its entirety as non-recognized audio (NRA), i.e., the identity of the audio content at every timepoint is unknown, as shown at block 204. The identification of the audio stream attempts to segment the broadcast stream by creating Recognized Audio (RA) and Non-Recognized Audio (NRA) segments, and initially, prior to identifying any audio within the stream, all of the audio will be considered NRA.

After receiving the audio, an audio sample of a few seconds duration, for example, is selected from the broadcast stream, as shown at block 206. A sample starting time of the selected portion of audio within the broadcast stream is noted, as shown at block 208. For example, if the sample analyzer began recording the audio stream at 2:10 pm, an audio sample may be taken at the 2:12 pm mark within the stream. Thus, the starting time of the selected portion of audio is marked to be 2:12 pm in this example.

Next, content in the selected portion of audio is identified, as shown at block 210, and a relative time offset of the audio sample is determined (time into the song from which the portion of audio is taken), as shown at block 212, using the audio search engine 108. The audio search engine may embody any known identification technique. Various audio sample identification techniques are known in the art for identifying audio samples using a database of audio tracks. The following patents and publications describe possible examples for audio recognition techniques, and each is entirely incorporated herein by reference, as if fully set forth in this description.

Kenyon et al, U.S. Pat. No. 4,843,562, entitled "Broadcast Information Classification System and Method"

Kenyon, U.S. Pat. No. 5,210,820, entitled "Signal Recognition System and Method"

Haitsma et al, International Publication Number WO 02/065782 A1, entitled "Generating and Matching Hashes of Multimedia Content"

Wang and Smith, International Publication Number WO 02/11123 A2, entitled "System and Methods for Recognizing Sound and Music Signals in High Noise and Distortion"

Wang and Culbert, International Publication Number WO 03/091990 A1, entitled "Robust and Invariant Audio Pattern Matching"

Briefly, identifying a signal begins by receiving the signal and sampling it at a plurality of sampling points to produce a plurality of signal values. A statistical moment of the signal can be calculated using any known formulas, such as that noted in U.S. Pat. No. 5,210,820. The calculated statistical moment is then compared with a plurality of stored signal identifications and the received signal is recognized as similar to one of the stored signal identifications. The calculated statistical moment can be used to create a feature vector which is quantized, and a weighted sum of the quantized feature vector is used to access a memory which stores the signal identifications.

In another example, generally, audio content can be identified by identifying or computing characteristics or fingerprints of an audio sample and comparing the fingerprints to previously identified fingerprints. The particular locations within the sample at which fingerprints are computed depend on reproducible points in the sample. Such reproducibly computable locations are referred to as "landmarks." The location within the sample of the landmarks can be determined by the sample itself, i.e., is dependent upon sample qualities, and is reproducible. That is, the same landmarks are computed for the same signal each time the process is repeated. A landmarking scheme may mark about 5-10 landmarks per second of sound recording; of course, landmarking density depends on the amount of activity within the sound recording.

One landmarking technique, known as Power Norm, is to calculate the instantaneous power at every possible timepoint in the recording and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal. Other methods for calculating landmarks may also be used.

Once the landmarks have been computed, a fingerprint is computed at or near each landmark timepoint in the recording. The nearness of a feature to a landmark is defined by the fingerprinting method used. In some cases, a feature is considered near a landmark if it clearly corresponds to the landmark and not to a previous or subsequent landmark. In other cases, features correspond to multiple adjacent landmarks. The fingerprint is generally a value or set of values that summarizes a set of features in the recording at or near the timepoint. In one embodiment, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value is just the single frequency value of the strongest spectral peak.

To take advantage of the time evolution of many sounds, a set of timeslices is determined by adding a set of time offsets to a landmark timepoint. At each resulting timeslice, a spectral slice fingerprint is calculated. The resulting set of fingerprint information is then combined to form one multitone or multi-slice fingerprint. Each multi-slice fingerprint is more unique than the single spectral slice fingerprint, because it tracks temporal evolution, resulting in fewer false matches in a database index search.

For more information on calculating characteristics or fingerprints of audio samples, the reader is referred to U.S. Patent Application Publication US 2002/0083060, to Wang and Smith, entitled System and Methods for Recognizing Sound and Music Signals in High Noise and Distortion, the entire disclosure of which is herein incorporated by reference as if fully set forth in this description.

Thus, the audio search engine 108 will receive the audio sample and compute fingerprints of the sample. The audio search engine 108 may compute the fingerprints by contacting additional recognition engines. The audio search engine 108 can then access the database 110 to match the fingerprints of the audio sample with fingerprints of known audio tracks by generating correspondences between equivalent fingerprints, and the file in the database 110 that has the largest number of linearly related correspondences or whose relative locations of characteristic fingerprints most closely match the relative locations of the same fingerprints of the audio sample is deemed the matching media file. That is, linear correspondences in the pairs of landmarks are identified, and sets are scored according to the number of pairs that are linearly related. A linear correspondence occurs when a large number of corresponding sample locations and file locations can be described with substantially the same linear equation, within an allowed tolerance. The file of the set with the highest score, i.e., with the largest number of linearly related correspondences, is the winning file.

To determine a relative time offset of an audio sample, the fingerprints of the audio sample can be compared with fingerprints of the original files to which they match. Each fingerprint occurs at a given time, so after matching fingerprints to identify the audio sample, a difference in time between a first fingerprint of the audio sample and a first fingerprint of the stored original file will be a time offset of the audio sample, e.g., amount of time into a song. Thus, a relative time offset (e.g., 67 seconds into a song) at which the sample was taken can be determined.

In particular, to determine a relative time offset of an audio sample, a diagonal line with a slope near one within a scatter plot of the landmark points of a given scatter list can be found. A scatter plot may include known sound file landmarks on the horizontal axis and unknown sound sample landmarks (e.g., from the audio sample) on the vertical axis. A diagonal line of slope approximately equal to one is identified within the scatter plot, which indicates that the song which gives this slope with the unknown sample matches the sample. An intercept at the horizontal axis indicates the offset into the audio file at which the sample begins. Thus, using the identification method disclosed by Wang and Smith, for example as discussed above, produces an accurate relative time offset between a beginning of the identified content file from the database and a beginning of the audio sample being analyzed, e.g., a user may record a ten second sample of a song that was 67 seconds into a song. Hence, a relative time offset is noted as a result of identifying the audio sample (e.g., the intercept at the horizontal axis indicates the relative time offset). Other methods for calculating the relative time offset are possible as well.

Thus, the Wang and Smith technique returns, in addition to metadata associated with an identified audio track, a relative time offset of the audio sample from a beginning of the identified audio track. As a result, a further step of verification within the identification process may be used in which spectrogram peaks may be aligned. Because the Wang and Smith technique generates a relative time offset, it is possible to temporally align the spectrogram peak records within about 10 ms in the time axis, for example. Then, the number of matching time and frequency peaks can be determined, and that is the score that can be used for comparison.

For more information on determining relative time offsets, the reader is referred to U.S. Patent Application Publication US 2002/0083060, to Wang and Smith, entitled System and Methods for Recognizing Sound and Music Signals in High Noise and Distortion, the entire disclosure of which is herein incorporated by reference as if fully set forth in this description.

As yet another example of a technique to identify content within the audio stream, an audio sample can be analyzed to identify its content using a localized matching technique. For example, generally, a relationship between two audio samples can be characterized by first matching certain fingerprint objects derived from the respective samples. A set of fingerprint objects, each occurring at a particular location, is generated for each audio sample. Each location is determined in dependence upon the content of a respective audio sample and each fingerprint object characterizes one or more local features at or near the respective particular location. A relative value is next determined for each pair of matched fingerprint objects. A histogram of the relative values is then generated. If a statistically significant peak is found, the two audio samples can be characterized as substantially matching. Additionally, a time stretch ratio, which indicates how much an audio sample has been sped up or slowed down as compared to the original audio track can be determined. For a more detailed explanation of this method, the reader is referred to published PCT patent application WO 03/091990, to Wang and Culbert, entitled Robust and Invariant Audio Pattern Matching, the entire disclosure of which is herein incorporated by reference as if fully set forth in this description.

Referring back to FIG. 2, after a successful content recognition (as performed by any of the methods discussed above), the (1) audio track identity, (2) relative time offset (e.g., time between the beginning of the identified track and the beginning of the sample), and optionally (3) a time stretch ratio (e.g., actual playback speed to original master speed) and (4) a confidence level (e.g., a degree to which the system is certain to have correctly identified the audio sample) are returned by the audio search engine 108. In many cases, the time stretch ratio (TSR) may be ignored or may be assumed to be 1.0 as the TSR is generally close to 1. The confidence level can be used to allow fault tolerance on the separation of NRA and RA. The TSR and confidence level information may be considered for more accuracy.

Subsequently, the relative time offset is used with the sample start time to calculate an extrapolated sample start time, as shown at block 214. The extrapolated start time indicates the start time of the full sample within the audio stream. A length of the full sample can then be determined, as shown at block 216, by accessing the database 110, for example, and looking up the length based on the track identity. Using the track length, an end time of the sample can be calculated as well, as shown at block 218.

Figure 3:
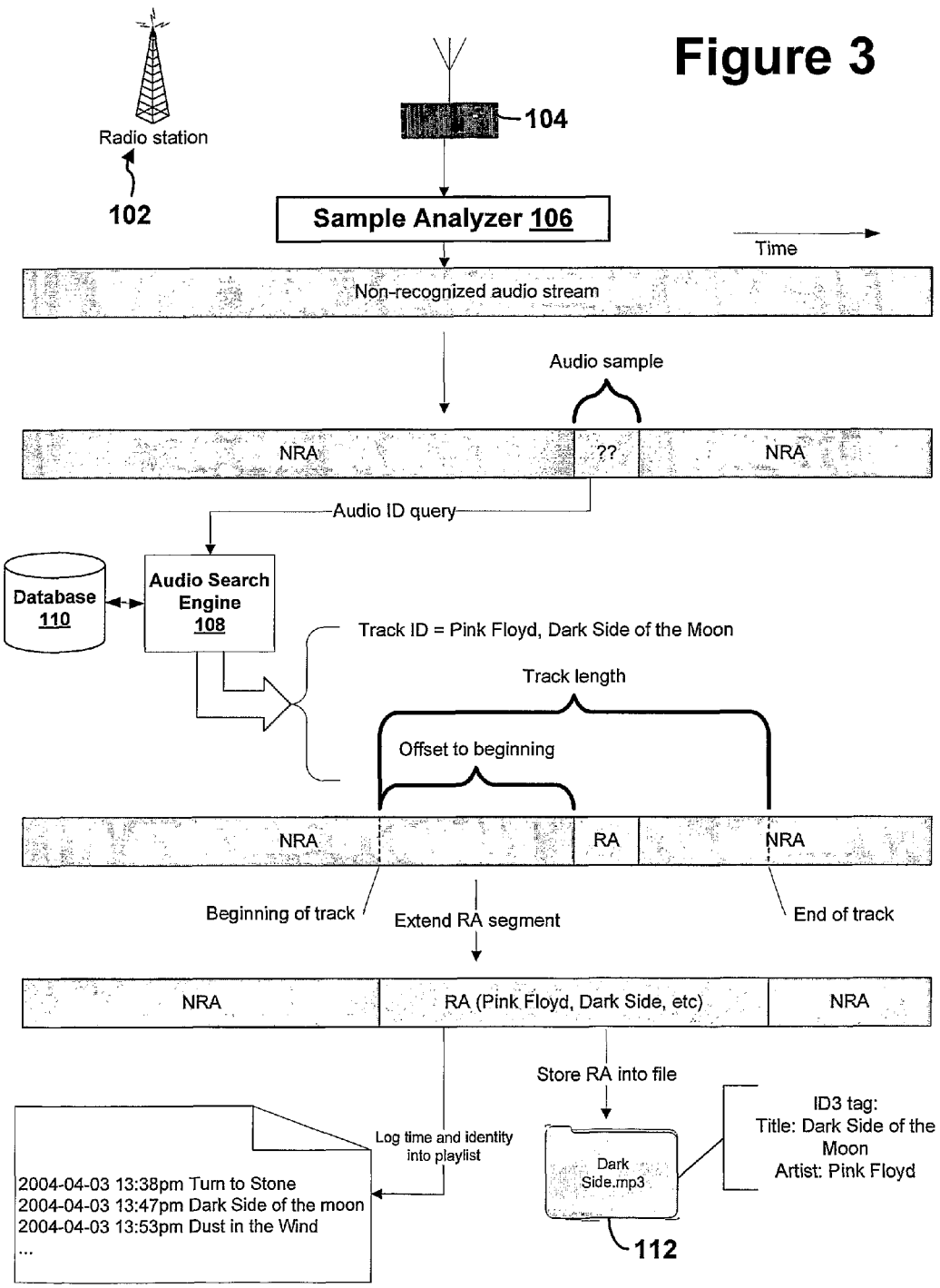
FIG. 3 conceptually illustrates one example of a process for identifying audio captured from an audio stream.

FIG. 3 conceptually illustrates a process of identifying audio captured from an audio stream, as described above with reference to FIG. 2. As shown, the captured audio stream is initially all marked "Non Recognized Audio." An audio sample is taken and submitted to an audio identification engine, such as audio search engine 108, which includes or accesses a musical track database (e.g., database 110). The track identity, relative time offset, and track length of the sample are then determined. In this example, the audio is identified as being a song by Pink Floyd, entitled "Dark Side of the Moon."

Using the relative time offset and start time of the sample, the "Recognized Audio" region can be extended to a beginning of the identified track. For example, suppose the start time of the sample was 2:12 pm, and the relative time offset was 2 minutes. Thus, the audio sample is from a portion of the track 2 minutes into the song, and so the start time of the track was at 2:10 pm. As shown in FIG. 3, the offset to the beginning would be 2 minutes (assuming TSR is approximately 1). Thus, the audio track start time is calculated as shown below in Equation 1.

$$\text{Audio track start time} = (\text{sample starting time}) - (\text{relative time offset}) \ast (\text{time stretch ratio}) \quad \text{Equation (1)}$$

Furthermore, associated with the track identity of RA is a track length datum retrieved from the database 110. Using the track length, the RA region can be extended to an end of the identified track. For example, since the start time of the track was calculated, then the end time of the track is calculated to be the track start time plus the track length, as shown below in Equation 2.

$$\text{Audio track end time} = (\text{sample starting time}) - (\text{relative time offset}) \ast (\text{time stretch ratio}) + (\text{track length}) \ast (\text{time stretch ratio}) \quad \text{Equation (2)}$$

The audio track is then bracketed by these extrapolated endpoint time values. For example, the entire time interval of the broadcast stream between the audio track start time and the audio track end time is marked as "recognized" and furthermore labeled with the track identity as determined above, thus extending the recognized audio segment beyond the original audio sample. As a result, the broadcast stream now contains a segment of RA.

If an identification attempt does not return a result, then a region around the unidentifiable audio sample can be marked as "unidentifiable". An audio sample may then be taken at the edge of the unidentifiable region to attempt to find a boundary of a new "recognized" region, for example. The identification and extension process is repeated on the broadcast stream on new audio samples from "non-recognized" intervals until no more non-recognized segments remain, i.e., only "unidentifiable" and "recognized" segments remain. The unidentifiable segments could correspond to non-program audio, such as a DJ talking, or an audio program (such as music) that is not in the identification database, for example.

Figure 4:
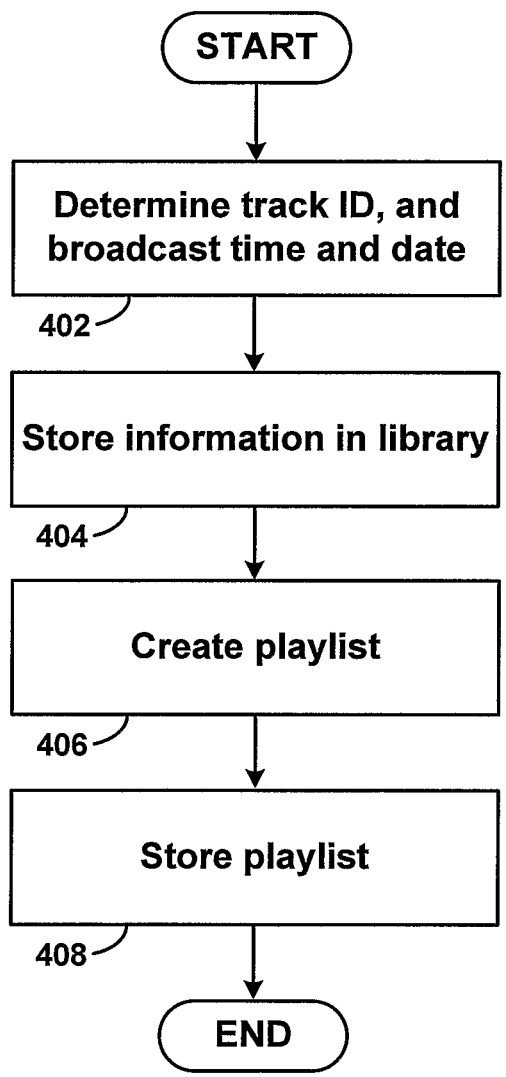
FIG. 4 is a flowchart depicting one example of a method for storing identified tracks.

Information pertaining to the identified audio content may be stored in a file in the library 112 and identity metadata (e.g., in ID3 format) can be attached to the file. In addition, a time span of occurrence of the identified audio content can be logged into a playlist, so that a listing of tracks and corresponding times at which the tracks were broadcast can be compiled. For example, FIG. 4 is a flowchart depicting storage of identified tracks. After determining a track identity, broadcast time and date, as shown at block 402, the information can be stored in the library 112, as shown at block 404. Each recognized audio segment comprising the interval between the corresponding audio track start and stop times may be copied into a corresponding file in a music library archive. The library 112 may be accessed by any number of users to determine what songs have been played on a certain day, for example.

The resulting files in the library 112 may be labeled with identification metadata: for example, the filename could be a composition of the track title and artist. A pointer to such metadata may be supplied as a label. Furthermore, each audio file optionally may be stored, such as in a compressed format like MP3 or AAC, or Real Audio format. Furthermore, for each recognized audio segment, an ID3 tag record may be populated with identification metadata corresponding to the audio track identity and appended to the audio file. The files may be displayed in a track list for a user to select for playback at a later point in time.

After logging the information in the library 112, a playlist is created and stored as shown at blocks 406 and 408. For example, a playlist of identified (e.g., recognized) time segments is compiled along with corresponding identification information and can be provided to a customer who is interested in subscribing to this information. An example playlist is shown below in Table 1.

TABLE 1

| Date | Time | Track ID |
|---|---|---|
| 2004-04-03 | 13:38 pm | Turn to Stone |
| 2004-04-03 | 13:47 pm | Dark side of the moon |
| 2004-04-03 | 13:53 pm | Dust in the wind |

The playlist information may be provided in real-time, with minimal latency due to the fact that as new non-recognized audio is received, an identification may be performed on an incoming audio sample, resulting in a known audio track end time in the future, corresponding to audio data that has not yet been received. In an example embodiment, the next audio sample to be analyzed is scheduled to be captured starting immediately after the current known audio track end time occurs. The identification information may thus be presented in real-time, with only at most a few seconds' delay, for example.

Segmentation by Direct and Adaptive Identification

Using the methods discussed above, a broadcast audio stream can be segmented into portions of recognized and non-recognized audio. Audio samples can be selected from the broadcast stream for identification based on a direct or adaptive identification technique. Using a direct technique, audio samples can be taken at predetermined intervals, such as every 30 seconds or other periodic intervals, for example.

However, to gain efficiency, it is not necessary to perform a further sampling and identification step on any part of the broadcast stream within a "recognized" region. Such oversampling would be redundant, given an accurate identification. Rather than periodically sampling, once a sample is identified and segmented within the audio stream, the next time to sample can be calculated to be outside the time of the identified sample. Thus, the sampling period can be adaptively adjusted to be at times after identified tracks. In this manner, the sampling density can be optimized.

Figure 5:
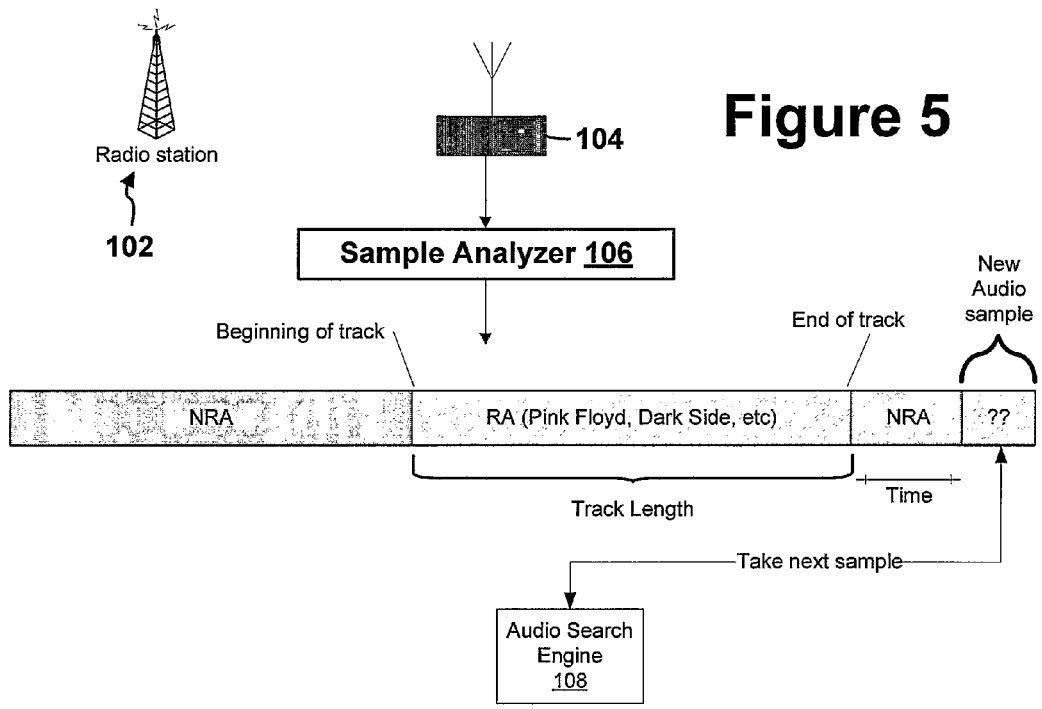
FIG. 5 conceptually illustrates one example of adaptively adjusting a sampling interval of an audio stream.
Figure 6:
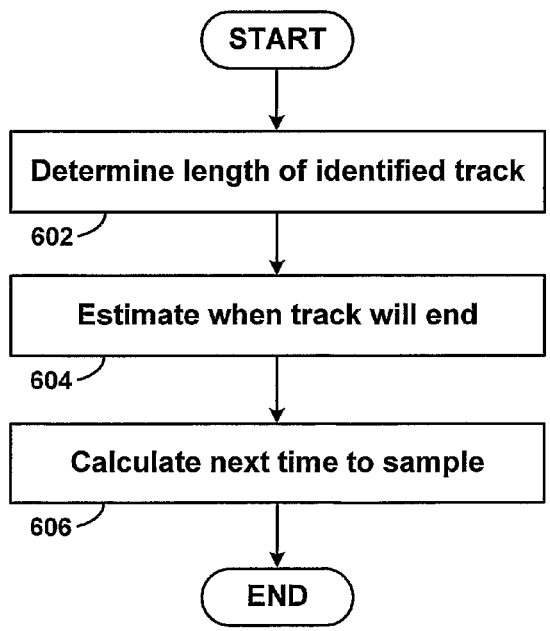
FIG. 6 is a flowchart depicting one example of a method for adaptively adjusting a sampling interval of an audio stream.

FIG. 5 conceptually illustrates adaptively sampling an audio stream. For example, as shown, once the track has been identified as RA (e.g., as being the Pink Floyd song) it is not necessary to sample the audio stream again until after the song is over. Thus, as shown in FIG. 6, after determining the length of the identified track, as shown at block 602, the next time to sample can be calculated based on the ending time of the track, as shown at blocks 604 and 606. Further, it may not be desirable to sample exactly at an endpoint of a track since the endpoint may contain a transition between tracks that may not be able to be identified. Thus, the next time to sample can be calculated to be a few seconds after the end of the identified track, as shown in FIG. 5. So, based on an understanding of the structure of the audio in the stream (e.g., location of beginning and end of tracks), a sampling pattern can be adaptively configured.

Figure 7:
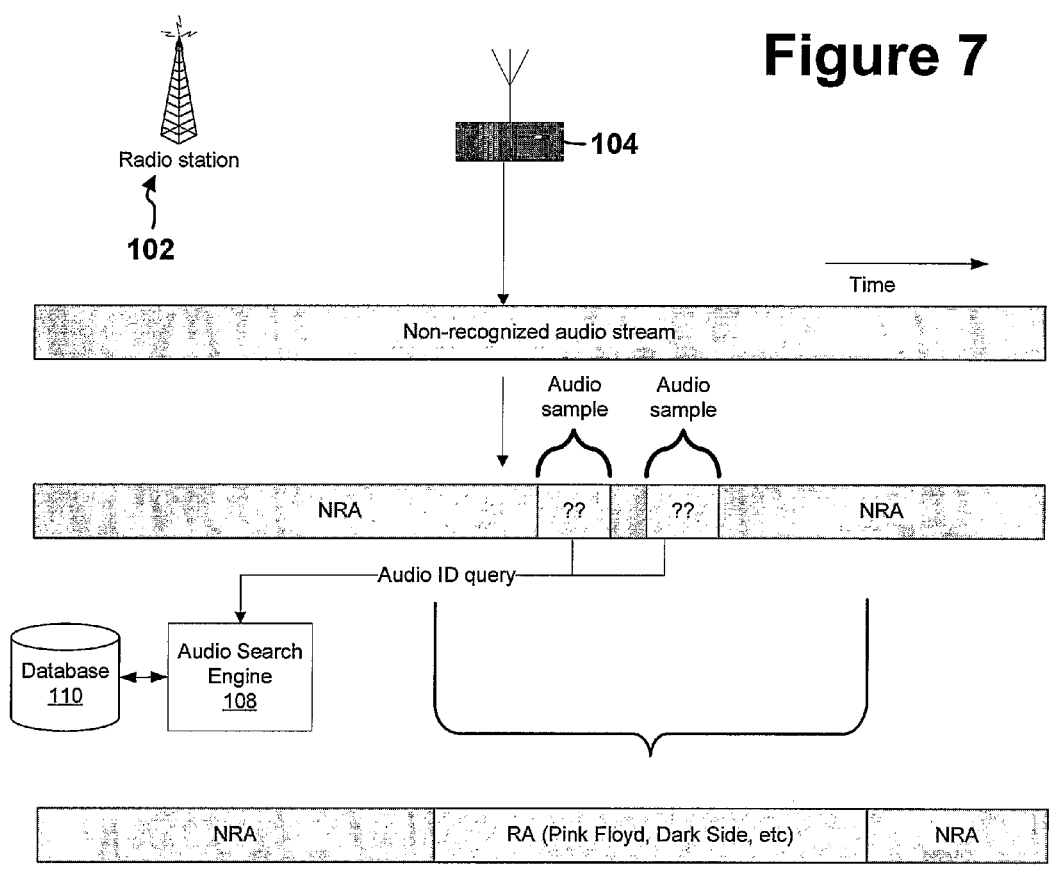
FIG. 7 conceptually illustrates another example of a process of identifying audio captured from an audio stream.

To increase certainty within the identification process, multiple samples close in time may be taken and identified, as shown in FIG. 7. Multiple samples taken from the same track should yield the same track ID. For example, as shown in FIG. 7, multiple samples both have been identified as the Pink Floyd song. In this way, multiple dense samplings may be taken and when the track ID changes, there can be assumed to have been a program transition (i.e., track change) in between the boundary samples. The time span represented by the matching samples then can be used to demarcate the identified track.

In yet another enhancement using the multiple sampling approach, the extrapolated audio track start time (or equivalently the audio track end time) should remain about the same if the track identity does not change within samples. Hence samples that have substantially similar audio track start times can be grouped together and such samples should also have the same track identity. This provides another measure to verify the identification process. This may be useful for cases in which multiple recognition results are returned for a recognition request and may help to determine which track is actually present. Multiple recognition results can be returned when two or more tracks contain elements that are based on the same source material, for example extended or dance mixes. In such a case, multiple sets of {track ID, Audio Track Start Time, and optionally Track Length} are returned by the audio search engine for a given sample. To identify the track, the track identity and audio track start time are chosen for which the most samples concur.

In a further aspect within any of the embodiments disclosed herein, any residual NRA including unidentifiable segments may be copied into corresponding audio files and submitted to a human listener in an attempt to identify the contents. The human listener may have tools to further edit NRA and possibly re-categorize the NRA as RA. NRA segments that could not be identified by the audio search engine 108 are candidates for new musical releases that were not yet in the database 110. Hence, this analysis represents one example of an automatic way of encapsulating and presenting potential new musical releases that should subsequently be added to the audio search engine's database, once properly annotated.

Many embodiments have been described as being performed, individually or in combination with other embodiments, however, any of the embodiments described above may be used together or in any combination to enhance certainty of identifying samples in the data stream. In addition, many of the embodiments may be performed using a consumer device that has a broadcast stream receiving means (such as a radio receiver), and either (1) a data transmission means for communicating with a central identification server for performing the identification step, or (2) a means for carrying out the identification step built into the consumer device itself (e.g., the audio recognition means database could be loaded onto the consumer device). Further, the consumer device may include means for updating the database to accommodate identification of new audio tracks, such as Ethernet or wireless data connection to a server, and means to request a database update. The consumer device may also further include local storage means for storing recognized segmented and labeled audio track files, and the device may have playlist selection and audio track playback means, as in a jukebox.

Note that while the present application has been described in the context of a fully functional recognition system and method, those skilled in the art will appreciate that the mechanism of the present application is capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

While examples have been described in conjunction with present embodiments of the application, persons of skill in the art will appreciate that variations may be made without departure from the scope and spirit of the application. For example, although the broadcast data-stream described in the examples are often audio streams, the invention is not so limited, but rather may be applied to a wide variety of broadcast content, including video, television or other multimedia content. Further, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

What is claimed is:

1. A method for segmenting a broadcast data stream comprising:
   receiving a sample of the broadcast data stream;
   receiving a start time of the sample;
   determining a track identity of the sample;
   determining a relative time offset of the sample from a beginning of the identified track; and
   calculating via a processor an extrapolated start time of the identified track within the broadcast data stream by subtracting the relative time offset from the start time of the sample, wherein the extrapolated start time indicates a boundary between tracks in the broadcast data stream.

2. The method of claim 1, wherein calculating the extrapolated start time comprises:
   determining a relative playback speed ratio of the identified track; and
   adjusting the extrapolated start time and the extrapolated end time due to the relative playback speed.

3. The method of claim 1, further comprising determining an extrapolated end time of the sample, wherein the identified track comprises a segment of the broadcast data stream between the extrapolated start time and the extrapolated end time.

4. The method of claim 3, further comprising marking a time interval of the broadcast data stream between the extrapolated start time and the extrapolated end time as recognized, thereby extending a recognized segment within the broadcast data stream beyond the sample.

5. The method of claim 4, further comprising calculating the next time to sample the broadcast data stream based on a length of the recognized segment.

6. The method of claim 3 further comprising copying the segment of the broadcast data stream into a file.

7. The method of claim 6, further comprising:
   retrieving metadata associated with the track identity; and
   associating the metadata with the sample.

8. The method of claim 7, further comprising:
   organizing information of the segment of the broadcast data stream into a playlist according to the metadata;
   displaying the playlist to a user;
   allowing the user to select a file from the playlist; and
   playing the file.

9. The method of claim 3, wherein determining the extrapolated end time comprises:
   obtaining a track length of the identified track; and
   adding the track length to the extrapolated start time.

10. The method of claim 9, wherein obtaining the track length comprises looking up the track length based on the track identity.

11. The method of claim 1, wherein determining the track identity comprises accessing a database containing track identities.

12. The method of claim 1, further comprising writing the extrapolated start time and the track identity into a file.

13. The method of claim 12, further comprising sending the extrapolated start time and the track identity to a subscriber.

14. The method of claim 1, wherein the broadcast data stream is an audio stream.

15. A method for identifying content within an audio stream comprising:
- receiving samples of an audio stream;
- receiving start times of each sample;
- determining a track identity of each sample;
- for each sample, calculating via a processor an extrapolated start time by subtracting a relative time offset from the start time of the sample, wherein the extrapolated start time indicates a boundary between tracks in the broadcast stream;
- identifying samples having substantially similar extrapolated start times; and
- for samples having substantially similar extrapolated start times, verifying that the samples also have matching track identities.

16. The method of claim 15, further comprising, for each sample, determining an extrapolated end time of the identified track, wherein the identified track comprises a segment of the audio stream between the extrapolated start time and the extrapolated end time.

17. The method of claim 16, wherein determining the extrapolated end time comprises:
- obtaining a track length of the identified track; and
- adding the track length to the extrapolated start time.

18. The method of claim 16, further comprising marking a time interval of the audio stream between the extrapolated start time and the extrapolated end time as recognized, thereby extending a recognized audio segment within the audio stream beyond the sample.

19. The method of claim 18, further comprising calculating the next time to sample the audio stream based on a length of the recognized audio segment.

* * * * *